G. A. CASE.
AGRICULTURAL SYSTEM.
APPLICATION FILED APR. 1, 1920.
1,391,169.
Patented Sept. 20, 1921.
5 SHEETS—SHEET 3.
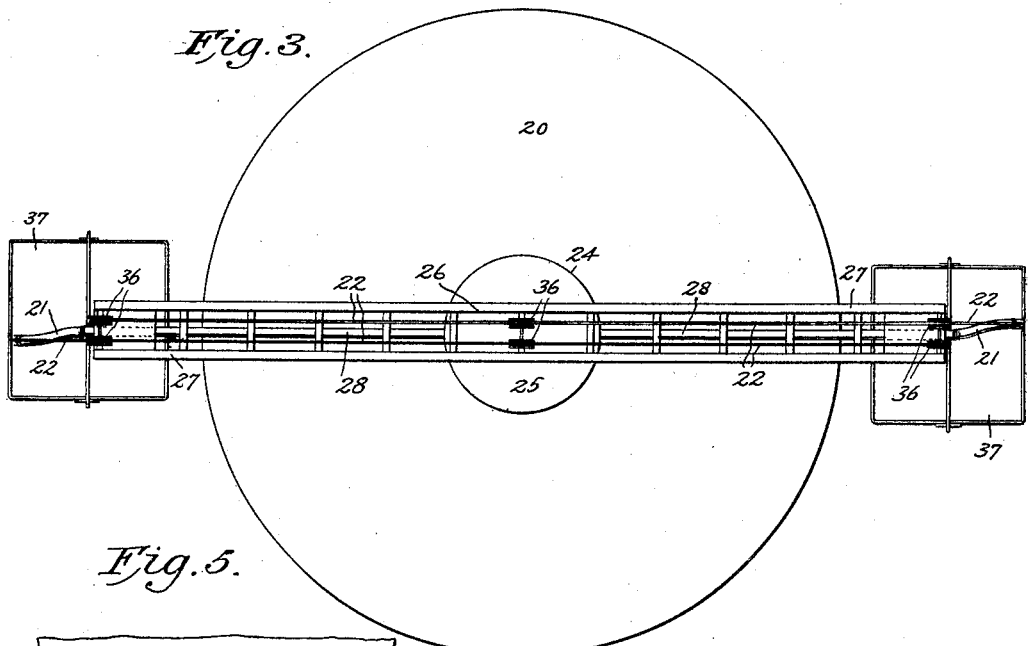
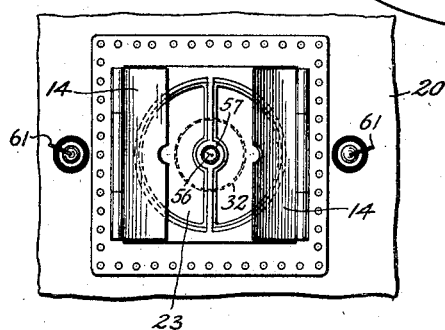
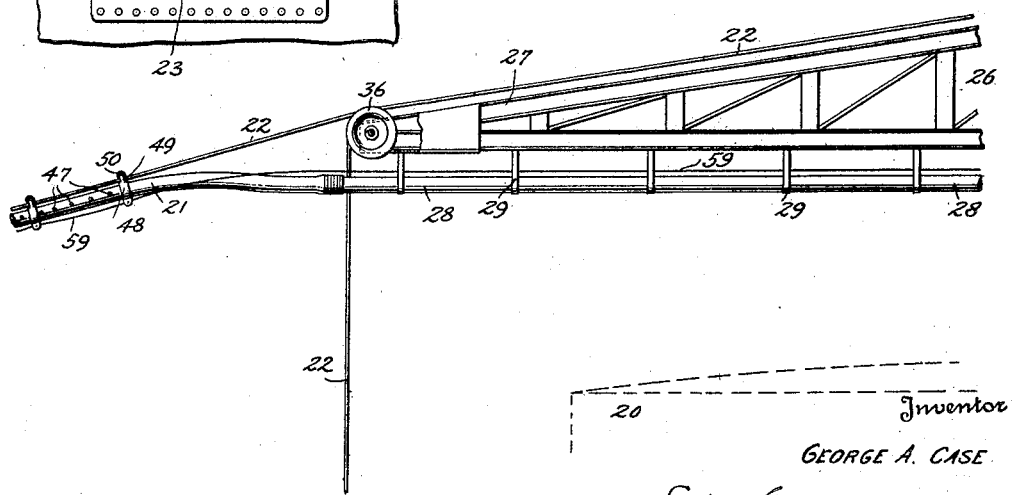
Inventor
GEORGE A. CASE G. A. CASE.
AGRICULTURAL SYSTEM.
APPLICATION FILED APR. 1, 1920.
1,391,169.
Patented Sept. 20, 1921.
5 SHEETS—SHEET 4.
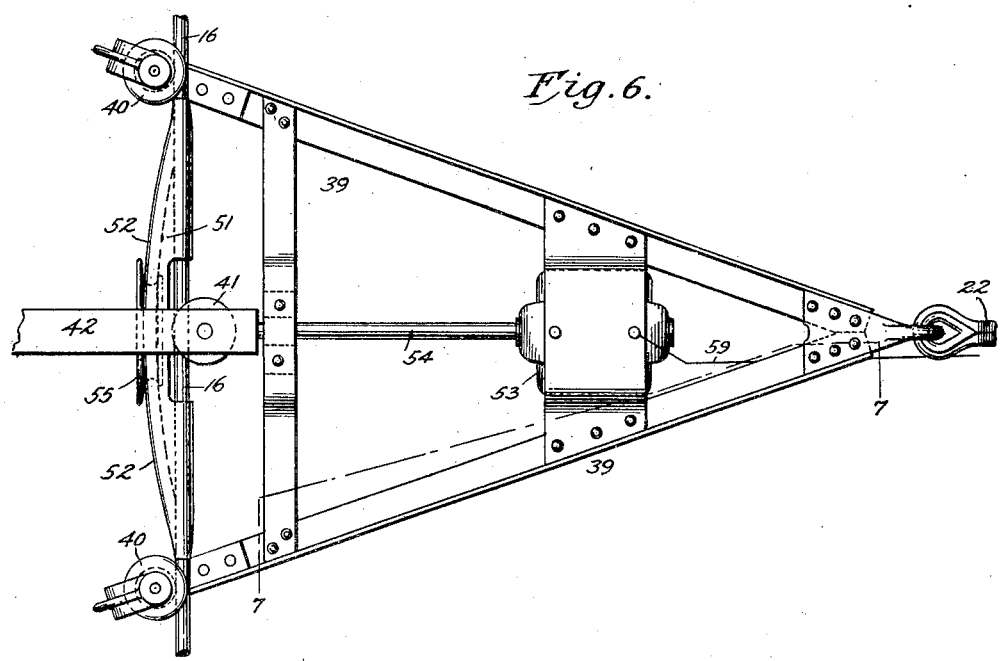
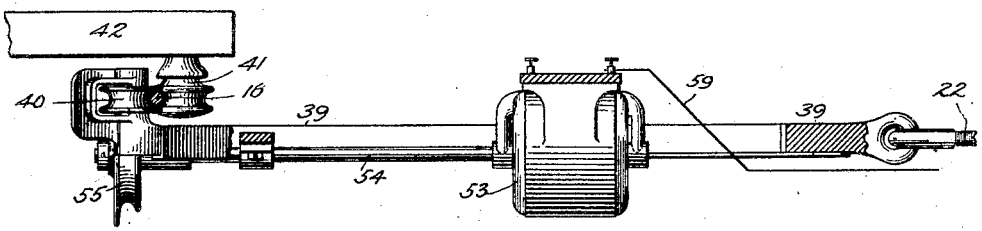
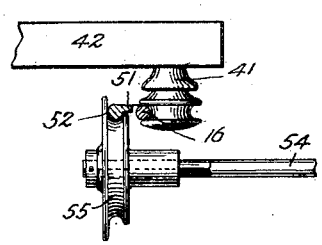
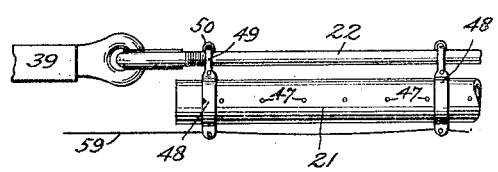
Inventor
GEORGE A. CASE
By E. W. Anderson Son
Attorneys G. A. CASE.
AGRICULTURAL SYSTEM.
APPLICATION FILED APR. 1, 1920.
1,391,169.
Patented Sept. 20, 1921.
5 SHEETS—SHEET 5.
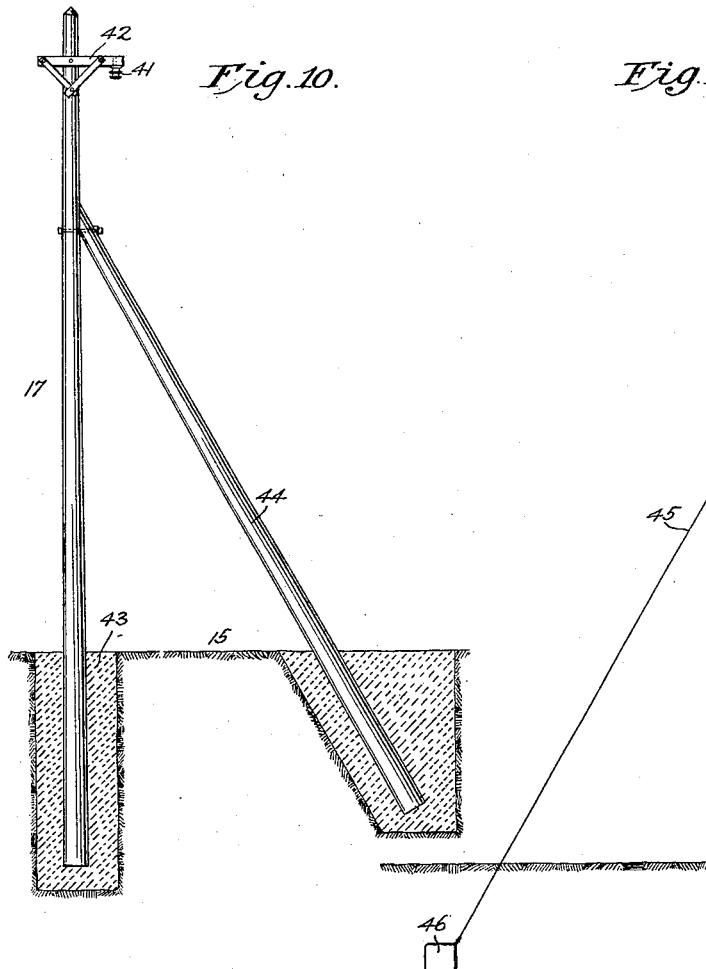
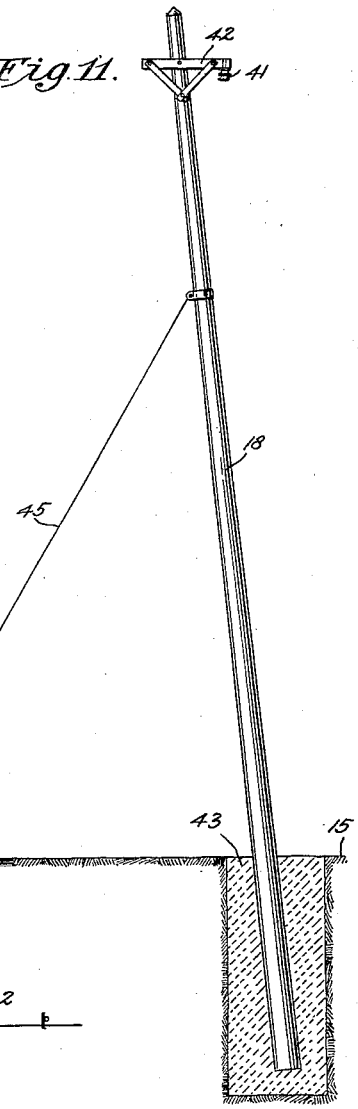
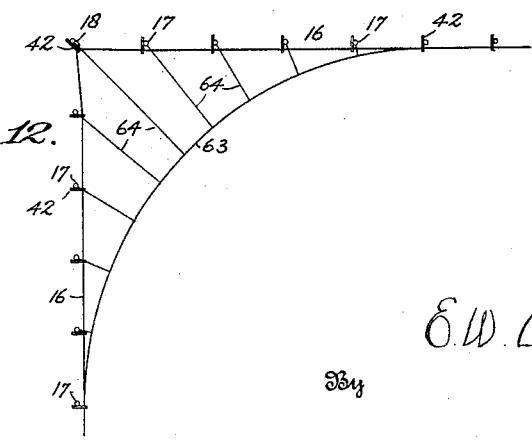
Inventor
GEORGE A. CASE

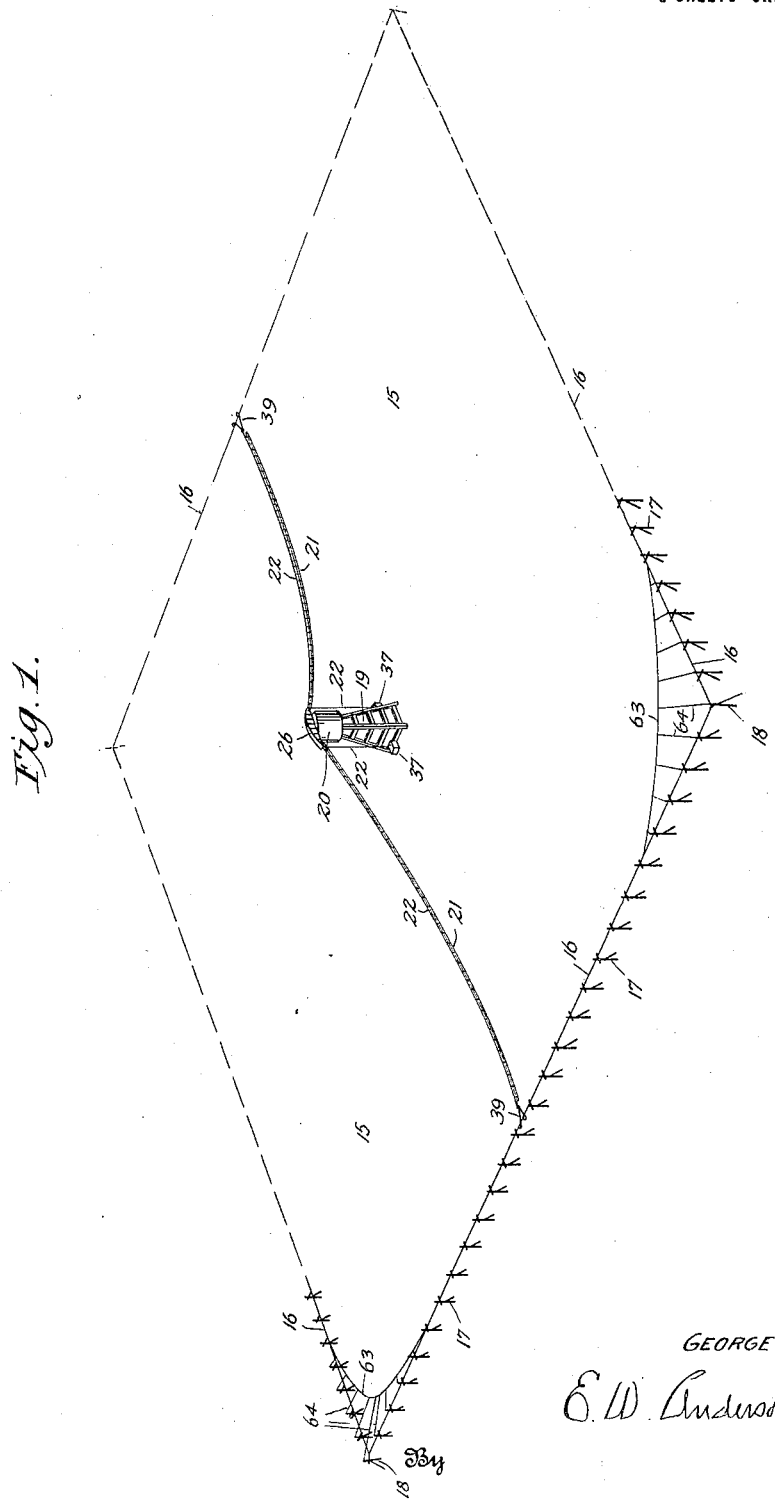

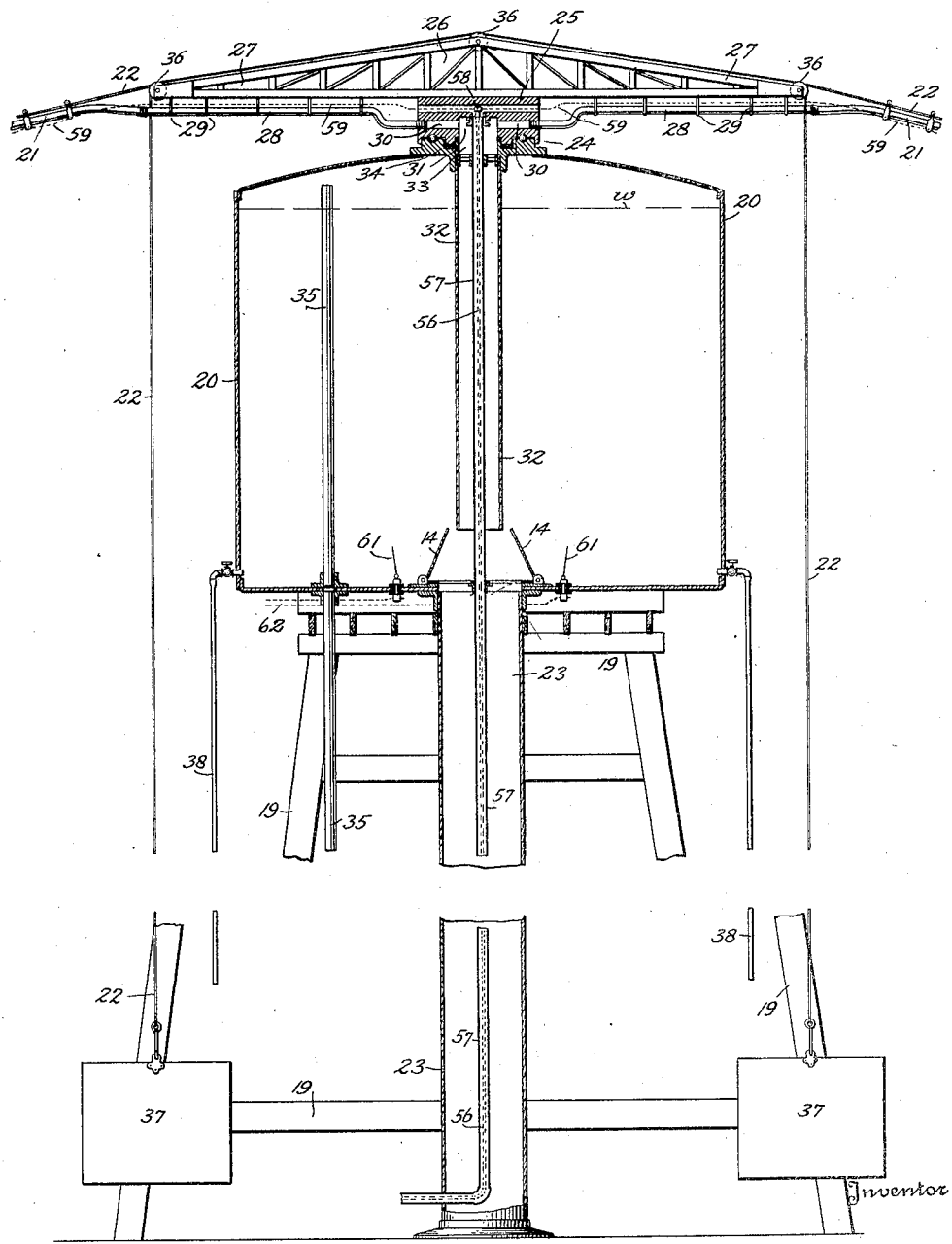

UNITED STATES PATENT OFFICE.

GEORGE A. CASE, OF JOPLIN, MISSOURI.

AGRICULTURAL SYSTEM.

1,391,169.  Specification of Letters Patent.  Patented Sept. 20, 1921.

Application filed April 1, 1920. Serial No. 370,462.

*To all whom it may concern:*

Be it known that I, GEORGE A. CASE, a citizen of the United States, resident of Joplin, in the county of Jasper and State of Missouri, have made a certain new and useful Invention in Agricultural Systems; and I declare the following to be a full, clear, and exact description of the same, such as will enable others skilled in the art to which it appertains to make and use the invention, reference being had to the accompanying drawings, and to letters or figures of reference marked thereon, which form a part of this specification.

This invention relates to an agricultural system for evenly, thoroughly and when desired, continuously treating a relatively large tract of land with a fluid medium, being found useful in irrigation, in fire and frost prevention, in the application of various sprays and fertilizers, and in the distribution of fine seed and powdered substances. Other objects and advantages will hereinafter appear.

These results are attained through the use of an elevated reservoir or tank and one or more perforated flexible pipes connected to said reservoir and leading therefrom to the border of the tract of land, said pipe or pipes being revoluble around the tank and over the land to water or otherwise treat the same. Each flexible pipe is supported and kept above the ground by means of a cable extending from the reservoir to the edge of the field from which cable the pipe is suspended. Fastened on the outer end of the cable is a trolley movable on an elevated track surrounding the field to be irrigated, the inner end of said cable being connected to a take up device to permit the cable to lengthen and shorten while rotating to accommodate for irregularities in the dimensions of the field between the reservoir and the track around the field. The rotation of the flexible pipe is effected by the combined action of the water escaping from the perforations in one side of the pipe and an electrically driven motor mounted on the trolley frame turning a wheel bearing on the elevated track.

With the above as the principal objects in view, the invention consists in the novel construction and arrangement of parts to produce the result desired which will be set forth in the following description and illustrated in the accompanying drawings, in which:—

Figure 1 is a diagrammatic perspective view of a field or tract of land with the improved irrigation system erected thereon.

Fig. 2 is a central vertical sectional view through the elevated reservoir or tank.

Fig. 3 is a top plan view of the tank.

Fig. 4 is a detail view of one end of the rotating pipe supporting frame.

Fig. 5 is a plan view of a portion of the reservoir bottom showing the flap valves for closing the stand pipe discharge.

Fig. 6 is a plan view of the trolley frame attached to the outer end of the cable for supporting the flexible water distributing pipe above the surface of the ground, its connection to an elevated track around the border of the field to be irrigated and driving means mounted on said frame.

Fig. 7 is a longitudinal sectional view of the frame on line 7—7 of Fig. 6.

Figs. 8 and 9 are detail views showing features of the invention.

Fig. 10 is an elevation of one of the track supporting posts.

Fig. 11 is a similar view of a track supporting post at a corner of the field to be irrigated, and Fig. 12 is a diagrammatic plan view of the track at one corner of the field.

In the drawings, 15 indicates a field or farm, preferably square in outline which may contain about forty acres. Around the border of the field is an elevated track 16, which may be and preferably is a cable, supported on posts 17, 18 a suitable distance above the ground. In the center of the field is erected a derrick or frame 19 for supporting at the necessary height a water tank or reservoir 20 from which one or more flexible pipes 21 cross over the field to the track 16, being carried by cables 22 extending from the reservoir to said track in a manner hereinafter described.

The reservoir or tank 20 has a capacity suitable for the purpose and is firmly secured on the top of the frame or derrick 19, see Fig. 2. A stand pipe 23 leads from the ground to the tank 20 into which it discharges, a pump or other means, not shown, delivering water to the stand pipe. Escape of water from the reservoir through the stand pipe when the pump is not working is prevented by means of a pair of flap valves 14 within the reservoir and hinged to close over the discharge end of stand pipe 23. The tank 20 is closed air tight at the top and upon this top is fixed the lower member of a turn table 24, the upper member 25 of which is rigidly fastened on the under side of a frame 26 consisting of laterally extending arms 27 which project over and beyond the tank for a short distance. A horizontal pipe 28 is supported on the under side of each frame arm 27 in any convenient manner as by yokes 29, its outer end being connected to a flexible pipe 21. The inner end of each pipe 28 is in communication with a passage 30 in the turntable member 25, said passages opening into a chamber 31 also in said member. An outlet pipe 32 for the reservoir extends from near the bottom thereof to the lower member of turntable 24 to which it is fastened, a passage 33 in said member alining with chamber 31 and connects the outlet pipe with said chamber. The construction is such that the member 25 of the turntable may rotate on the lower member without impeding the passage of water from the reservoir to the pipe or pipes 28. Suitable packing 34 will be provided where necessary to prevent the escape of water.

An air pipe 35 connected to a suitable air pump, not shown, extends into the reservoir 20 and terminates above the water level $w$ so that air under sufficient pressure may be pumped into the reservoir to force the water therefrom through outlet pipe 32 and pipes 28, 21.

The rotatable frame 26 carrying the pipes 28 is preferably constructed with two arms 27, or multiples thereof, extending in opposite directions to properly balance the frame under its own weight, the weight of pipes 21, 28 and cables 22 as well as the tension of said cables. Each cable 22 passes at its inner end longitudinally over two oppositely projecting frame arms 27, being carried on rollers 36, then passing down beside the reservoir 20 and derrick or frame 19 to near the ground where it is attached to a take up weight 37, here shown as a bucket which may be filled more or less with water from the reservoir through a pipe or hose 38, so as to regulate and adjust the take up pull on the cables.

Each cable 22 extends above ground from frame 26 to the border of the field 15 where it is securely fastened to a frame 39 on which are journaled two flanged trolley wheels 40 that run against the outside of the overhead cable track 16, being held in engagement with the track by the tension of cable 22. The cable track is supported by hangers 41 fixed to cross arms 42 at the top of poles 17, 18, the lower ends of which are buried in the ground and preferably surrounded by concrete 43. A brace pole 44 on the inner side of pole 17 is also buried in the ground at its lower end, its upper end being bolted to the pole 17. The poles 18 at the corners of the field 15 are inclined outwardly as shown in Fig. 11, and have brace wires or cables 45 extending from near the top of the poles to anchorages 46 in the ground.

Suspended from the cable 22 is the flexible pipe 21 that extends from its connection to the pipe 28 to the frame 39. The outer end of pipe 21 is closed, a series of small perforations 47 being formed through the pipe on one side from end to end for the escape of water in fine streams, the reactionary effect of the escaping water serving to assist in rotating the pipe. Rings 48 fastened to pipe 21 at suitable distances apart have upwardly projecting fingers 49 that are arranged to slide on cable 22. If desired rollers 50 to lessen friction are journaled on the fingers 49 and run on cable 22.

There is always a liability of the trolley wheels 40 being derailed when they pass the hangers 41 and to avoid such result a track plate 51 is fastened on the cable track 16 opposite each hanger, and projecting on opposite sides thereof. The outer edge 52 of the track plate 51 is curved sufficiently to guide the trolley wheels around the hanger and so avoid derailment.

In connection with the reactionary driving means for rotating the pipes 21, there is provided an electric drive comprising a motor 53 bolted on the frame 39, its shaft 54 extending outwardly and fitted with a grooved wheel 55 that runs on the cable track 16. The grooved wheel has a limited movement longitudinally of the shaft 54 to permit wheel 55 passing freely along the curved edge of track plate 51. Current is carried to the motor 53 from a suitable generator by wires 56 passing through a pipe 57 within the stand pipe 23, then upwardly into the reservoir 20 and outlet pipe 32 to a rotary contact 58 in the upper member 25 of the turntable 24. From the contact 58 wires 59 pass through an opening 60 in the turntable member 25 to the motor 53, the wires being carried by the rings 48 supporting the flexible pipe 21.

Means are provided for electrifying the water before its discharge on the field, such means consisting of a pair of discharge points 61 projecting through the bottom of the reservoir 20 for a short distance and insulated therefrom, these points being connected by wires 62 to a suitable electrical generator.

At each corner of the field the trolley plate 39 is made to turn easily by stretching a wire or cable 63 in a curve around the corner and supporting it by brace wires 64 running therefrom to the poles 17, 18, the ends of the wire or cable being fastened to the straight lengths of the track 16, as shown in Fig. 12.

An irrigating system such as described when erected in field or on a farm will insure full and sufficient moisture to the growing crops. The water will fall continuously in small quantities and in a manner similar to rain, so long as the reservoir is supplied with water and air pressure and none will be lost by surface drainage. In operation when the reservoir is filled to the desired height with water and a sufficient pressure of air maintained in the reservoir, the water will be forced into the flexible pipe 21 and escape through the perforations 47 in its side, reacting to assist in rotating the pipe around the field and the frame 26 about turntable 24 on the reservoir. As an additional means of propulsion, the motor 53 will be energized to drive the grooved wheel 55 that bearing on the elevated track 16, will carry the outer end of the pipe around the field. It is to be noted that the elevated track 16 is not necessarily circular and concentric to the tank, but may be more or less irregular and is illustrated in the drawings as inclosing a square field. For this reason means are provided to allow the hose supporting cables to extend, such means being the take up weights 37 which rise as the cables lengthen upon approaching the corners and descend to take up the slack when they move away therefrom. The pipe 21 being flexible can straighten out or form in loops as the cable increases or decreases in length.

It may be found desirable to provide a gear wheel in place of the grooved wheel 55, the track in this case having rack teeth engaged by the gear.

Obviously, trees may be utilized, where these are present, in place of the supporting poles herein described.

Any fluid substance which can be lifted by the compressed air may be substituted for the water used in irrigation, and further, the device is well adapted to aid in the transportation of crops or other material about the field, and to serve as an elevated, movable support, as in fruit picking.

Having thus described the invention what is claimed is:—

1. An agricultural system comprising a source of fluid supply, a flexible perforated pipe extending from said source of supply to the border of an area to be treated, an elevated track around the border of said area, a supporting cable between the fluid supply and said track, a trolley attached to said cable to run on the track, and slidable suspending means on said cable for holding the perforated pipe.

2. An agricultural system comprising a source of fluid supply, a flexible perforated pipe extending from said source of supply to the border of an area to be treated, an elevated track around the border of said area, a supporting cable between the fluid supply and said track, a trolley attached to one end of said cable to run on the track, automatic take up means for adjustment of the cable, and slidable suspending means on said cable for holding the perforated pipe.

3. An agricultural system comprising a source of fluid supply, a flexible perforated pipe extending from said source of supply to the border of an area to be treated, an elevated track around the border of said area, a supporting cable between the fluid supply and said track, a trolley attached to one end of said cable to run on the track, driving means on said trolley, a variable take up weight on the opposite end of the cable, and slidable suspending means on said cable for holding the perforated pipe.

4. An agricultural system comprising an elevated tank or reservoir erected within the borders of an area of land to be treated, an elevated track around the borders of said area, a cable extending from said reservoir to said track, cable supporting means connected to one end of said cable and movable along the track, yieldable supporting means near said reservoir connected to the other end of said cable, and a flexible perforated pipe connected to said reservoir and supported above ground by said cable.

5. An agricultural system comprising an elevated tank or reservoir erected within the borders of an area of land to be treated, a frame rotatable on said reservoir, piping carried by said frame and connecting with the reservoir, an elevated track around the borders of said area of land, a cable yieldingly connected at one end to said frame and slidingly connected at the other end to said track, and a flexible perforated pipe supported by said cable and connected to the piping on said frame.

6. An agricultural system comprising an elevated tank or reservoir erected within the borders of an area of land to be treated, a frame rotatable on said reservoir, piping carried by said frame and connected with said reservoir, an elevated track around the borders of said area of land, a cable extending from said frame to said track, take up means for the inner end of said cable, a trolley secured on the outer end of said cable and movable along the elevated track, driving means carried by said trolley frame, and a flexible perforated pipe suspended from said cable and connected to the piping on said frame.

7. An agricultural system comprising an elevated tank or reservoir erected within the borders of an area of land, a stand pipe for supplying the same with water, an outlet pipe, a frame rotatable on said reservoir, piping carried by said frame and connected to the outlet pipe of said reservoir, an elevated track around the borders of said area of land, a cable extending from said frame to said track, a trolley frame connected to one end of said cable movable along said track, a motor on said trolley frame for moving the same, variable take up means connected to the opposite end of the cable, and a flexible perforated pipe suspended from said cable and connected to the piping on the frame whereby water escaping from said perforations will wet the ground and assist in rotating the pipe and rotatable frame.

8. In an agricultural system the combination of an elevated reservoir erected in the center of an area of land to be watered, a stand pipe leading to said reservoir from a suitable source of supply, an outlet pipe for said reservoir, an air pipe leading into said reservoir for delivering air under pressure, a rotatable frame on said reservoir, a turn table between said frame and reservoir, a pipe carried by said frame, a passage through the turn table connecting said reservoir outlet pipe and the pipe on the frame, an elevated track around the border of said area of land, a cable extending from the rotatable frame to said track and supported at its end to travel along the same, and a flexible perforated pipe suspended from said cable connected to the pipe on the rotatable frame.

9. In an agricultural system, the combination of an elevated reservoir erected in the center of an area of land to be watered, means for delivering water to and withdrawing it from said reservoir, a frame rotably mounted on said reservoir, an elevated track supported on poles surrounding said area of land, a cable extending from said rotatable frame to said track, rollers on said frame for guiding said cable, a variable take up weight on the inner end of said cable, a trolley frame attached to the outer end of said cable, rollers on said trolley frame to travel on said track and hold the cable above the ground, a motor mounted on the trolley frame to move the same, and a flexible perforated pipe suspended from said cable connected to the pipe on the rotatable frame and extending to the trolley frame.

In testimony whereof I affix my signature in presence of two witnesses.

GEO. A. CASE.

Witnesses:
PAUL G. KOONTZ,
A. W. THURMAN.